United States Patent [19]
Baumann et al.

[11] Patent Number: 5,546,362
[45] Date of Patent: Aug. 13, 1996

[54] DEPTH FINDER TRANSDUCER SYSTEM

[75] Inventors: Steven E. Baumann, Richfield, Minn.;
Richard E. Christman, deceased, late of Eden Prairie, Minn., by Steven E. Baumann, executor

[73] Assignee: Vexilar, Inc., Minneapolis, Minn.

[21] Appl. No.: 441,530

[22] Filed: May 15, 1995

[51] Int. Cl.$^6$ .................................................. H04R 1/44
[52] U.S. Cl. ................................................................ 367/173
[58] Field of Search ................................ 367/173, 165, 367/111, 99, 4, 910, 104; 43/26.1

[56] References Cited

U.S. PATENT DOCUMENTS

| | | | |
|---|---|---|---|
| 4,995,009 | 2/1991 | Altmire et al. | 367/910 |
| 5,173,882 | 12/1992 | Watson | 367/104 |

*Primary Examiner*—Daniel T. Pihulic
*Attorney, Agent, or Firm*—Kinney & Lange, P.A.

[57] ABSTRACT

A depth finder system of the present invention permits detection of the presence of objects within a body of water located below a body of ice. The depth finding system includes a display unit, an electrically conductive cable, and a transducer. The display unit is locatable on the body of ice adjacent a hole in the body of ice while the electrically conductive cable is electrically connected to the display unit. The transducer is capable of transmitting a sonar sensing wave in the shape of a cone through the body of water to detect the present of objects therein. The transducer system can include a positioning means for selectively fixing the conductive cable relative to the positioning means for selectively controlling the length of cable permitted to extend within a body of water below the body of ice.

20 Claims, 3 Drawing Sheets

Fig. 1 PRIOR ART

Fig. 2

DEPTH FINDER TRANSDUCER SYSTEM

BACKGROUND OF THE INVENTION

The present invention relates to systems and methods for determining the presence of objects within a body of water. In particular, the present invention relates to a system and method for detecting the presence of objects within a body of water covered by a body of ice.

Depth finding transducer systems are in widespread use to detect the presence of fish or other objects within a body of water. For example, a fisherman in a boat on open water can use a depth finding transducer system to detect both the depth of the water below the boat and the presence or absence of any fish or other objects below the boat.

A typical conventional depth finding system used on a boat includes a base display unit, a transducer, and a cable for connecting the transducer to the display unit. The transducer produces a sonar wave that is projected into the body of water in the shape of a cone for detecting the presence of objects within the water. In most cases, the transducer is rotatably or pivotally mounted to a hull of a boat in a location at which the transducer is at least partially submerged within the body of water. For example, the transducer can be mounted either on a side of the boat or at the rear of the boat. This rotatable mounting permits the transducer to be manipulated to insure the desired orientation of the sensing cone projected into the water.

Depth finding transducer systems are also used in situations in which a fisherman is not located in a boat on an open body of water. Instead, the fisherman may be located on shore but desires to detect the presence of objects such as fish within the body of water at a distance from the shore. Altmire et al. U.S. Pat. No. 4,995,009 provides one example of a castable fish/depth finder which permits a fisherman to "cast out" a depth finding transducer a spaced distance from the shoreline for determining the presence of objects below the transducer within a body of water.

Figure 1:
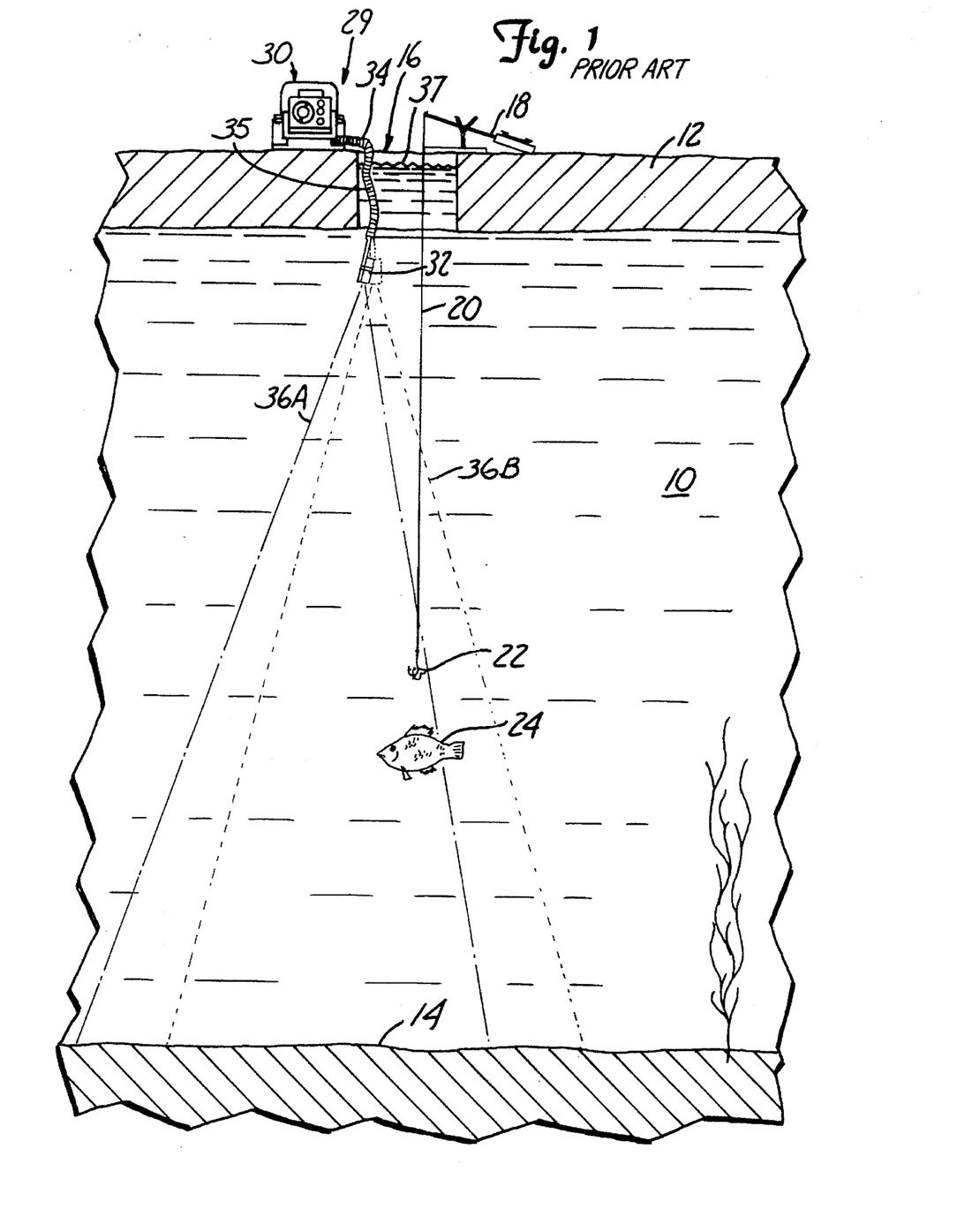
FIG. 1 illustrates a depth finding transducer system of the prior art as disposed within a body of water and on top of a body of ice.

Depth finding transducer systems can also be used in ice fishing to detect the presence of objects such as fish within a body of water below a body of ice covering the water. A prior art depth locator typically used in ice fishing is shown in FIG. 1. As shown in FIG. 1, a body of water 10 is covered by a body of ice 12. A bottom land surface 14 defines a lower boundary of the body of water 10 while the body of ice 12 defines the upper boundary of the body of water 10. The body of ice 12 can also include a hole 16 formed therein to provide access to the body of water 10. A fishing rod 18 is positioned adjacent the hole 16 to permit a fishing line 20 to extend through the hole 16 in the body of ice 12. A bait/hook combination 22 is provided at an end of line 20 and is located within the body of water 10, preferably adjacent a fish 24.

As shown in FIG. 1, a prior art depth finder system 29 typically includes a display unit 30, a transducer 32, and a positioning cable 34. The transducer 32 is capable of transmitting a sonar wave through the body of water 10 in the shape of a sensing cone 36A for detecting the presence of objects (e.g., fish 24 or bait/hook 22) within the cone 36A, as well as for determining the depth of the body of water 10. The positioning cable 34 provides an electrical and mechanical connection between the transducer 32 and the display unit 30. The positioning cable 34 is flexible yet capable of holding a desired shape or configuration created by manual manipulation of the shape of the cable 34. The transducer 32 is typically side mounted adjacent an end of the positioning cable 34. The display unit 30 includes electronic circuitry, a display, and a power source. The display unit 30 is typically mounted on or rests on a top surface of the body of ice 12 while the positioning cable 34 can be extended through the hole 16 in the body of ice 12 to position the transducer 32 within the water 10 to produce the sensing cone 36A within the water 10.

When placing the transducer 32 below the surface of the body of ice 12, it is desirable that a bottom surface of the transducer 32 be substantially planar with respect to a horizontal plane such as the bottom land surface 14. This orientation can be accomplished by aligning a longitudinal axis of the transducer 32 substantially perpendicular to the land surface 14. This desired orientation of the transducer 32 will produce a sonar wave oriented like sensing cone 36B (shown in FIG. 1), which is projected within the body of water 10 so that the bait 22 sits substantially within a center of the sensing cone 36B where the transducer sensitivity for detecting objects (e.g., fish) is the greatest. Fishermen attempt to achieve desired positioning of transducer 32 to yield sensing cone 36B by maneuvering the shape holding positioning cable 34. Unfortunately, actually achieving the desired orientation of transducer 34 to produce an optimally positioned sensing cone (like sensing cone 36B) is difficult due to the shape holding characteristics of the positioning cable 34. For example, the positioning cable 34 may have kinks or bends 35, as shown in FIG. 1, which are produced during maneuvering of the cable 34. These bends 35 interfere with a fisherman's attempts to align the cable 34 and transducer 32 in the desired orientation.

Frequently, the sensing cone 36A is produced despite a fisherman's best efforts at achieving sensing cone 36B. As seen in FIG. 1, when transducer 32 is oriented to project sensing cone 36A, the bait 22 sits at the edge of sensing cone 36A where the transducer sensitivity for detecting objects (e.g, fish) is the lowest. A fisherman compensates for orientation of sensing cone 36A by increasing the gain of the display unit until the bait/hook 22 can be clearly monitored on the display unit. However, increasing the gain usually reduces the sensitivity of the display unit to detecting fish not immediately adjacent the bait/hook combination, thereby artificially limiting the zone about the bait/hook 22 in which fish can be detected. This arrangement makes it more difficult to detect the presence of fish 24 adjacent the bait 22.

Currently, there are two methods for dealing with this transducer orientation problem. First, a bubble level (not shown) can be placed on the top of the transducer 32 which allows the fisherman to determine whether a bottom surface of the transducer 32 is oriented in the proper plane. In this method, the transducer 32 is preferably placed near a surface 37 of the body of water 10 so that the position of the transducer 32 can be easily manipulated in conjunction with the bubble level to achieve the proper leveling effect. However, transducers 32 placed near the surface of the water 10 produce a lot of "noise" reported on the display unit 30. This noise is generally undesirable and disliked by fishermen. Accordingly, this technique is not frequently used.

Alternatively, in an effort to avoid unnecessarily increasing the gain of the display unit, the fisherman may manipulate the positioning cable 34 and transducer 32 until the position of the transducer 32 corresponds to the strongest bait signal reported on the display base unit 30. In this situation, the fisherman presumes that the transducer 32 is level when the display unit 30 reports the strongest object identification signal, since the bait 22 should be hanging straight down in the water 10. However, this method can require extensive adjustment of the positioning cable 34 before a satisfactory alignment of the transducer 32 is achieved. Moreover, if a fisherman catches a fish, the transducer 32 and cable 34 are typically removed from the hole 16 before the fisherman lands the fish. This also necessarily requires either disconnecting the positioning cable 34 from the display unit 30 or moving the display unit 30 along with the positioning cable 34 and transducer 32. In either case, the transducer 32 must be repositioned once the depth finder system is re-employed within the hole 16 and body of water 10. Fishermen would like to avoid repositioning a depth finder system when ice fishing.

SUMMARY OF THE INVENTION

A depth finder system of the present invention provides an improved method for detecting the presence of objects within a body of water located below a body of ice. The present invention permits convenient alignment of a depth finding transducer within a body of water without requiring extensive manipulation of a positioning cable and without requiring one to substantially increase the gain of a display unit.

The depth finding system of the present invention includes a display unit, an electrically conductive cable, and a transducer. The display unit is locatable on the body of ice adjacent a hole in the body of ice. The electrically conductive flexible cable has a first end and a second end, wherein the first end is capable of being electrically connected to the display unit. The transducer is capable of transmitting a sonar sensing wave in the shape of a cone through a body of water to detect the presence of objects within the body of water. The transducer also includes a top surface having a center wherein the second end of the conductive cable is electrically connected to the transducer at the center of the top surface of the transducer.

The positioning means is cooperable with the conductive cable for allowing selective longitudinal positioning of the conductive cable relative to the positioning means. The positioning means is locatable adjacent the hole in the body of ice so that a portion of the cable can extend from the positioning means through the hole in the body of ice to position the transducer within the body of water in substantial vertical alignment below and spaced from the positioning means.

In one embodiment, the positioning means comprises a float mechanism capable of floating on a surface of the body of water within the hole in the body of ice. The float mechanism is capable of sliding longitudinally relative the conductive cable and capable of being selectively fixed relative to the conductive cable for preventing longitudinal sliding movement of the float mechanism relative to the conductive cable. In a second embodiment, the positioning means comprises an anchoring means removably mountable relative to a hole in the body of ice and capable of selectively fixing the conductive cable relative to the anchoring means to prevent longitudinal sliding movement therebetween. Both of these arrangements permit the fisherman to control the length of conductive cable that extends within the body of water and thereby control the relative depth of the transducer within the body of water. However, the float mechanism must be of a size and buoyancy to support the weight of the cable and transducer hanging in the body of water, whereas the anchoring mechanism need simply be mountable to or on the body of ice.

In one embodiment, the transducer comprises a cylindrical body including a sonar scanning head housed therein, preferably disposed adjacent a bottom end surface of the cylindrical body. While the transducer can comprise other shapes (e.g., cube, rectangle, sphere, etc.), a cylindrical body is preferred since it occupies the least amount of space (i.e., smallest footprint) when passing through the hole in the body of ice. In an alternative embodiment, the transducer comprises a cylindrical body including a first and second sonar scanning head. The first scanning head is disposed within the cylindrical body adjacent a bottom end surface of the cylindrical body and the second scanning head is disposed within the cylindrical body adjacent a side surface of the cylindrical body. This alternative embodiment including two sonar scanning heads further includes means for determining the rotational position of the transducer about its longitudinal axis.

A transducer system of the present invention is provided for use with a depth finder display unit. The transducer system comprises an electrically conductive flexible cable, a transducer electrically connected to the conductive cable, and a positioning means cooperable with the conductive cable and capable of selectively fixing position of the conductive cable relative to the positioning means to prevent longitudinal sliding movement therebetween. The cable has a length sufficient to permit the cable and transducer to be extended within a body of water below a body of ice.

The present invention also provides a method of detecting objects in a body of water located below a body of ice. A display unit is positioned on the body of ice adjacent a hole in the body of ice. A first end of a flexible conductive cable is electrically connected to the display unit. The conductive cable includes a transducer connected to its second end. A portion of the cable is selectively fixed relative to the hole in the body of ice and then the second end of the cable is extended through the hole in the body of ice into the body of water so that the transducer is located below the body of ice within the body of water in substantial vertical alignment below the fixed portion of the cable. The transducer is driven to transmit a sensing cone within the body of water to detect the presence of objects within the body of water.

The method and system of the present invention for detecting the presence of objects within a body of water has many advantages. First, the depth finding system and method of the present invention is configured to insure that a sonar wave produced by a transducer of the depth finding system is projected in the shape of a cone substantially vertically within a body of water located below a body of ice. This predictable orientation enables a fisherman to quickly and accurately position the bait/hook combination within the center of the sensing cone where the object identification sensitivity is the greatest. With this configuration, the gain of the display unit need not be substantially increased to identify the bait/hook combination in the sensing cone.

The easily obtainable desired orientation of the sensing cone directly results from the ability of the transducer and conductive cable of the depth finding transducer system to achieve a substantially vertical orientation of a longitudinal axis of the transducer within the body of water below the body of ice. In particular, the weight of the transducer tends to straighten the conductive cable so that an end surface of the transducer is oriented to produce a generally vertically aligned sensing cone as desired. In addition, the weight of the transducer tends to overcome any possible current or drift within the body of water that would overwise tend to displace the transducer and possibly change the orientation of the bottom end surface of the transducer. The mounting of the cable at the center of the top surface of the transducer further insures that the transducer will hang straight down (be aligned vertically with) from the cable.

Second, because the conductive cable is quite flexible, even under cold conditions, the conductive cable and transducer can be removed from the body of water very quickly if necessary. This is particularly convenient when a fisherman catches a fish and needs to insure that the conductive cable does not become entwined with the fishing line as the fisherman lands the fish. Moreover, unlike prior art systems (as described in FIG. 1), the conductive cable need not be disconnected from the display unit nor would one need to remove the entire depth finding system when removing the cable and transducer of the present invention from the water.

Of course, even after abruptly removing the cable and transducer from the body of water (to go to another hole or upon catching a fish), the cable and transducer can be dropped back through the hole in the body of ice and into the water and automatically align itself vertically again with virtually no effort from the fisherman to produce a vertically aligned sensing cone. Of course, this permits quick and predictable positioning of the bait within the center of the sensing cone. This instant re-deployment technique can be used with or without a positioning means of the present invention. However, by using a positioning means, such as the float mechanism or anchoring mechanism, on the cable, the desired length of cable to be extended within the water can be maintained even after removal of the transducer and cable from the water.

In addition, in the alternative embodiment in which the transducer comprises a cylindrical body housing two sonar scanning heads, one directed through a bottom end surface of the cylindrical body and the other directed through a side surface of the cylindrical body, the transducer permits detecting the presence of object such as fish in a relatively horizontal plane relative to the generally vertical plane of the sensing cone produced by the first sonar scanning head. This permits a fisherman to detect the presence of fish adjacent the available fishing zone so that a fisherman can determine whether the bait/hook should be located elsewhere.

DETAILED DESCRIPTION OF THE PREFERRED EMBODIMENTS

Figure 2:
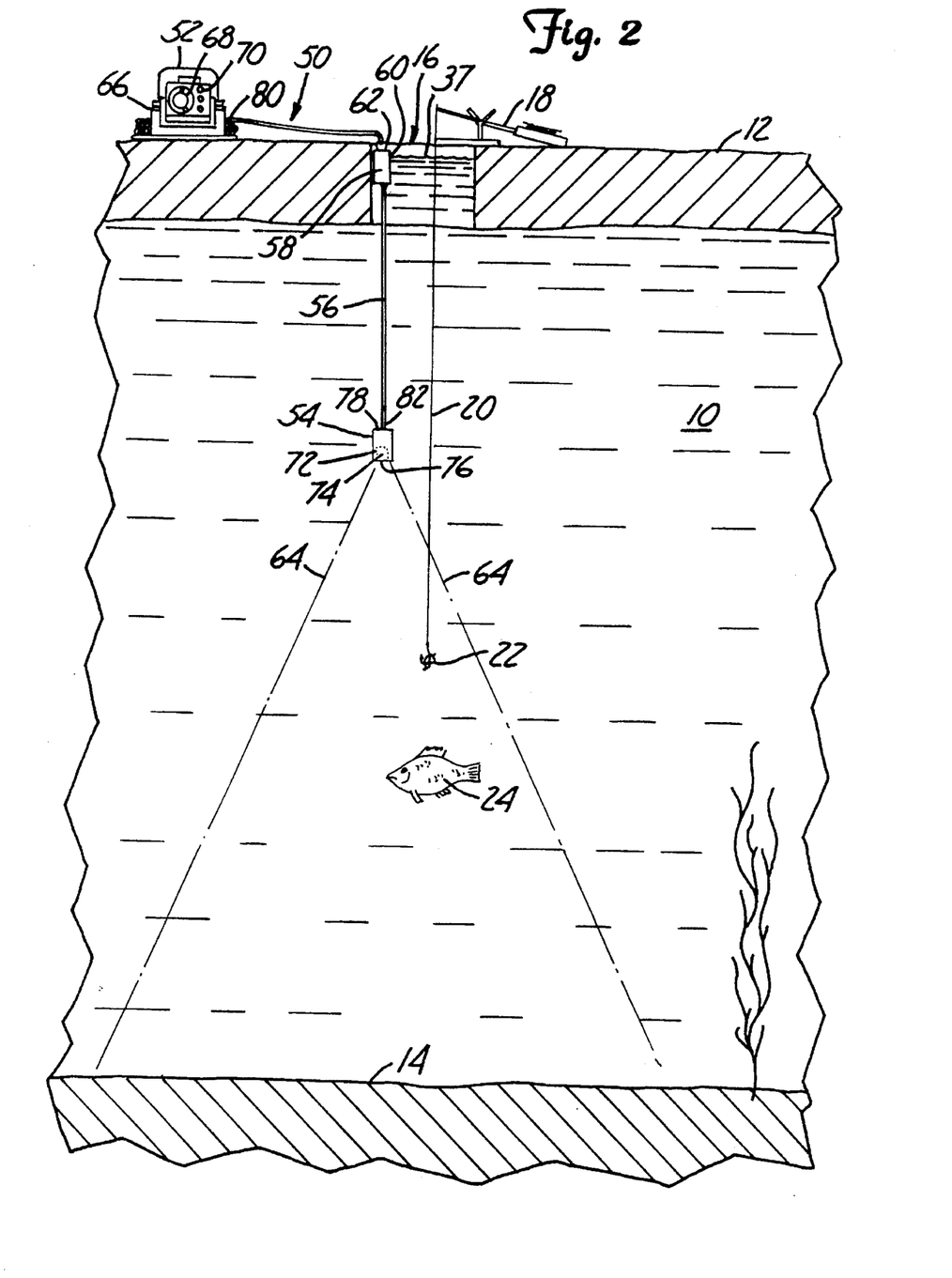
FIG. 2 illustrates a depth finding transducer system of the present invention as disposed within a body of water and on top of a body of ice.

A depth finder transducer system of the present invention is preferably employed in the environment illustrated generally in FIG. 2. This environment generally includes body of water 10, a body of ice 12, bottom land surface 14, and a hole 16 in the body of ice 12, all as previously described in connection with FIG. 1. This environment further includes a fishing rod 18, a fishing line 20, a bait/hook combination 22, and a fish 24, all being previously described in connection with FIG. 1.

A depth finder transducer system 50 of the present invention includes a display unit 52, a transducer 54, and a connecting cable 56. The system also includes a positioning stopper/float mechanism 58 comprising a float 60 and a stopper 62. A sonar wave in the shape of a cone 64 is projected from the transducer 54 into the body of water 10.

The display unit 52 includes a base unit 66, a display 68, and controls 70. The conductive cable 56 is a coaxial cable that is generally flexible and capable of providing an electrical and mechanical connection between the display unit 52 and the transducer 54. The conductive cable 56 preferably includes a material having the ability to return to a substantially straight shape from a coiled shape within a body of water having a temperature below 40° F. The cable 56 preferably has a diameter of about 0.100 to 0.200 inches.

The transducer 54 preferably comprises a cylindrical body 72 which houses a sonar scanning head 74. The cylindrical transducer body 72 includes a bottom end surface 76 and a top end surface 78. The sonar scanning head 74 is preferably disposed adjacent the bottom end surface 76 and includes a conventional depth finder transducer crystal for transmitting and receiving a high frequency signal. While the transducer can comprise other shapes (e.g., cube, sphere, etc.), the cylindrical transducer body 72 is preferred to minimize through the hole 16 in the body of ice 12. The transducer cylindrical body 72 can comprise an assembly including a housing made from a moldable plastic material. The sonar scanning head (or crystal) and a lead weight can be embedded within the plastic housing. The cylindrical transducer body 72 preferably has a weight of about one pound, which is about two to three times the weight of a conventional transducer.

The connecting cable 56 includes a first end 80 and a second end 82. The first end 80 of the cable 56 is electrically and mechanically connected to a base unit 66 of the display unit 52. The second end 82 of the conductive cable 56 is electrically and mechanically connected to a center of the top end surface 78 of the cylindrical transducer body 72. The cable 56 is flexible even under cold conditions (e.g., water temperature of 5° C.).

Figures 3, 5:
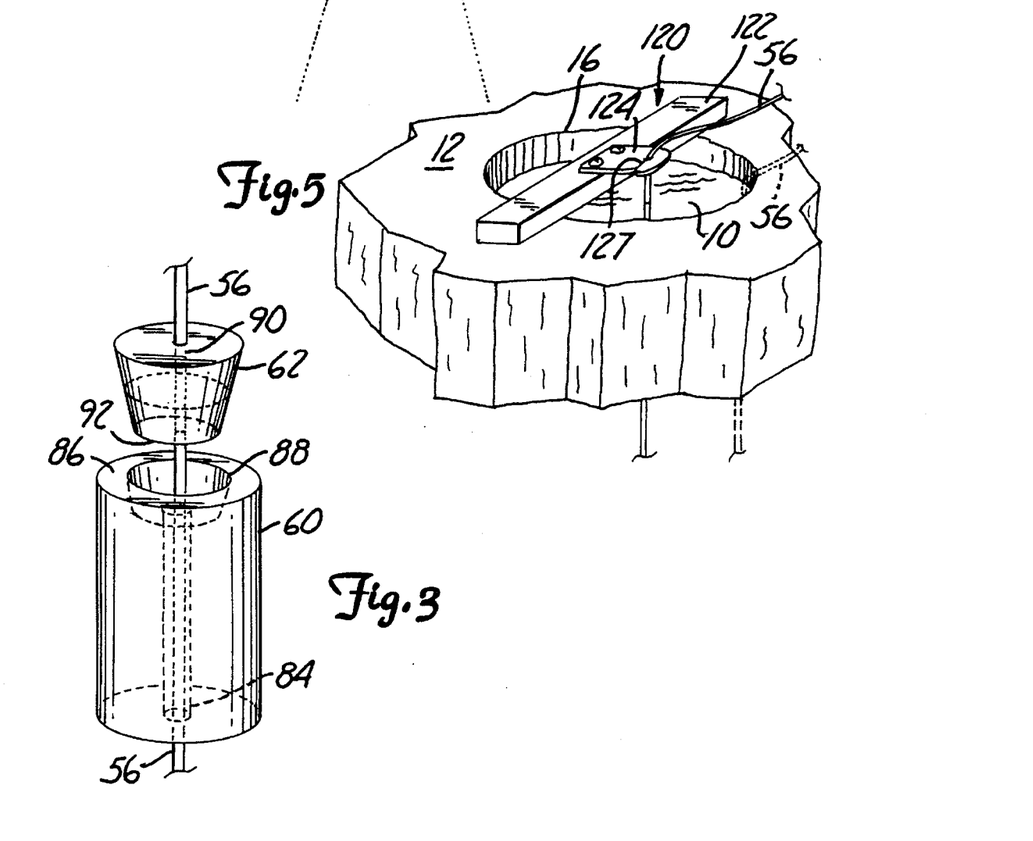
FIG. 3 is an exploded view of a float mechanism of the depth finding transducer system of the present invention.
FIG. 5 is a perspective view of a positioning means of the depth finding transducer system of the present invention as disposed relative to a hole in a body of ice overlying a body of water.

The float mechanism 58 is further illustrated in FIG. 3. As shown in FIG. 3, the float mechanism includes the float 60 and the stopper 62. Float member 60 is preferably an elongate tubular cylindrical body capable of floating on a surface of a body of water and including a bore 84 extending therethrough. The bore 84 permits the float member 60 to slide coaxially over and longitudinally relative to the conductive cable 56. The float 60 also includes a top end 86, a bottom end 87, and a cylindrical aperture 88 formed in the top end. The float 60 can be made of any material capable of floating buoyantly on a surface of a body of water and is of a size and buoyancy to support the weight of the cable 56 and the transducer 54 when hanging in the body of water 10.

The stopper 62 includes a bore 90 formed therein which extends along a central longitudinal axis of the stopper 62. The stopper 62 also includes a bottom end 92. The bore 90 of the stopper 62 is capable of slidably receiving the conductive cable 56 therethrough. The surface of the bore 90 of stopper 62 frictionally engages a surface of the conductive cable 56 such that the stopper frictionally engages a surface of the conductive cable 56 such that the stopper 62 is capable of both longitudinal sliding movement relative to the cable 56 as well as being capable of retaining a position relative to the cable 56. The bottom end 92 of the stopper 62 is capable of fitting into and frictionally engaging the cylindrical aperture 88 at the top end 86 of the float member 60 to selectively fix the float member 60 relative to the stopper 62.

Alternatively, instead of sliding longitudinally relative to the cable 56, the stopper 62 can be configured to include an adjustable clamp arranged to clamp onto the cable 56 at a desired position.

The positioning float mechanism 58, including the float 60 and stopper 62, can be positioned anywhere along the length of the cable 56 between its first end 80 and its second end 82. Thus, the depth of the transducer body 72 within the body of water 10 can be selected by selectively positioning the stopper 62 along the cable 56. In addition, the bore 84 extending through the body of float member 60 has a diameter sufficient so that the float member 60 can be removed from its coaxial position relative to the cable 56 by sliding the float member 60 longitudinally over an end of the conductive cable 56, such as the first end 80.

The sonar scanning head 74 of the transducer 54 is capable of producing a sonar sensing wave that is transmittable through the body of water 10 in the shape of a cone (like cone 64), and which in cooperation with the display unit 52, permits the detection of the presence of objects within the sensing cone. The transducer 54, including the cylindrical body 72, has a weight sufficient to prevent buoyancy at expected depths of the transducer 54 and sufficient to straighten the cable 56 within the body of water.

To use the depth finding system of the present invention, the display unit 52 is first mounted temporarily on a top surface of the body of ice 12. The first end 80 of the conductive cable 56 is connected to the base unit 66 of display unit 52 while the second end 82 of the conductive cable 56 is electrically connected to a center of the top surface 78 of the cylindrical transducer body 72.

Next, the float mechanism 58 is maneuvered along the length of the conductive cable 56 until the float mechanism 58 is located at a desired position longitudinally relative to the second end of the cable 56. In particular, this maneuvering is accomplished by maintaining the stopper 62 separate from the float member 60. The stopper 62 is slid along the length of cable 56 to a desired location wherein the stopper 62 remains frictionally engaged with the cable 56. Alternatively, if the stopper 62 comprises a clamp, the stopper 62 is fastened at a desired position along the length of the cable 56.

The float member 60 is then advanced toward the stopper 62 so that the bottom end 92 of the stopper 62 frictionally engages the cylindrical aperture 88 of the float member 60. This fixes the float mechanism 58 relative to the cable 56 so that a desired length of the cable 56 extends beyond a bottom end 87 of the float member 60. This length of cable 56 will correspond to the desired depth of the transducer 54 within the body of water 10 relative to the body of ice 12.

With the positioning mechanism 58 in place relative to the cable 56, the fisherman drops the transducer 54 and conductive cable 56 through the hole 16 in the body of ice 12 thereby allowing the transducer 54 and cable 56 to extend down into the body of water 10. The positioning float mechanism 58 floats adjacent the top surface 37 of the body of water 10 within the hole 16 and the conductive cable 56 hangs downwardly from the positioning float mechanism 58 in a substantially vertical fashion such that the longitudinal axis of the transducer 54 is in substantial vertical alignment below the positioning float mechanism 58. As can be seen in FIG. 2, the weight of the transducer 54 (which tends to straighten the cable 56), the flexibility of cable 56, and top center mounting of the second end of the cable 56 to the transducer causes a bottom surface 76 of the cylindrical transducer body 72 to be substantially planar relative to a horizontal plane extending through the body of water 10.

Next, the controls 70 of the display unit 52 are operated so that the sonar scanning head 74 of the transducer 54 produces a sonar sensing wave projected through the body of water 10 in the shape of sensing cone 64. the gravity alignment of the transducer 54 causes sonar wave sensing cone 64 (produced by the transducer 54) to be in substantially vertical alignment within the body of water 10 below the hole 16, and particularly below the positioning member 58.

To insure that the bait/hook combination 22 rests centrally within the sensing cone 64 within the body of water 10 (where detection sensitivity is the greatest), the fishermen need only position the conductive cable 56 within the hole 16 in the body of ice adjacent the fishing line 20. This insures that the sonar wave sensing cone 64 will permit detection of the presence of objects, such as fish, immediately adjacent the bait/hook combination 22. This also permits the fisherman to operate the controls 70 of display unit 52 in a manner so that sensitivity to objects at the periphery of the sensing cone can be maintained, further enabling the detection of the presence of objects, such as fish, not immediately adjacent the bait/hook combination. In particular, the gain of the display unit need not be artificially increased to compensate for a nonvertical alignment of the sonar wave sensing cone, wherein the increased gain would cause a loss in the sensitivity of detecting fish.

Figure 4:
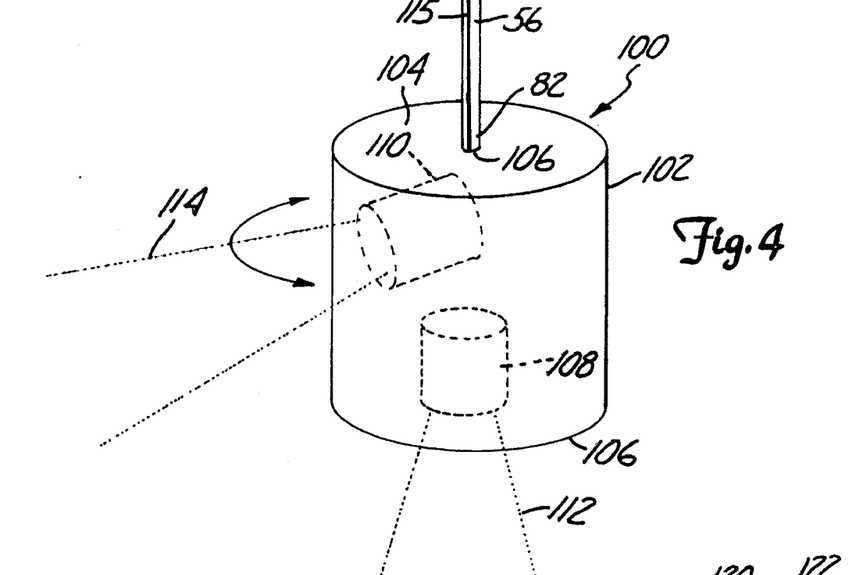
FIG. 4 is an enlarged view of an transducer of the depth finder transducer system of the present invention incorporating a first sonar scanning head and a second sonar scanning head.

FIG. 4 illustrates an alternative embodiment of the transducer of the depth finding transducer system of the present invention. As shown in FIG. 4, a transducer 100 includes a cylindrical body 102 having a top end surface 104 and a bottom end surface 106. The cylindrical body 102 houses a first sonar scanning head 108 and a second sonar scanning head 110. The second end 82 of the conductive cable 56 is electrically connected adjacent a center at the top surface 104 of the cylindrical body 102. Each of the first and second sonar scanning heads 108 and 110 are capable of producing a sonar sensing wave in the shape of cone 112 and 114, respectively, transmittable through the body of water. The sonar sensing cone 112, like the sensing cone 64 shown in FIG. 2, aligns generally vertically within the body of water while the sensing cone 114 produced by the second sonar scanning head 110 extends in a generally horizonal plane within the body of water 10. This second sonar scanning head 110 permits a fisherman to detect the presence or absence of objects within the body of water in a horizontal plane in addition to the capability of detecting the presence of objects within a vertical plane by sonar scanning head 108. Moreover, by rotating the conductive cable 56 and thereby rotating the transducer 100, the sonar scanning head 110 can be rotated to a desired degree, up to 360°, so that a fisherman can detect the presence of objects in a horizontal plane in a 360° panorama about the transducer 100. The cable 56 can further include a stripe 115 to enable a fisherman to determine the rotational position of the cable 56 and transducer 100 to track the orientation of the sensing cone 114. This double sonar scanning head is particularly advantageous when ice fishing since it permits the fisherman to detect the presence of objects such as fish located in regions not directly below the hole 16 in the body of ice and therefore not reachable by the bait/hook combination 22. The fisherman can use this information as a prompt for creating a new hole in the body of ice 12 over the expected location of fish (based upon their detection within the horizontal sensing cone 114) or as an aid to monitor fish just outside the current bait/hook zone.

FIG. 5 illustrates an anchoring mechanism 120 of the present invention for use in place of the float mechanism 58 comprising float 60 and stopper 62 (FIG. 3). This anchoring mechanism 120 includes a bar 122 and a gripper 124. The bar 122 has a length sufficient to extend across a hole 16 in the body of ice 12 so that the bar 122 can be anchored relative to the hole in the body of ice 12. The gripper 124 includes a slot 127 which is cooperable with the conductive cable 56 so that the gripper 124 can selectively fix the conductive cable 56 relative to the gripper 124. Like the float mechanism 58, the anchoring mechanism 120 permits the fisherman to position the cable 56 relative to the anchoring mechanism 120 so that a desired length of the cable 56 extends within the body of water 10. In addition, the anchoring mechanism 120 permits the fisherman to quickly deploy the transducer 54 and the cable 56 to the desired location within the body of water 10 by merely dropping the cable 56 into the water 10 wherein the relative position of the anchoring mechanism 120 relative to the hole 16 insures proper positioning of the transducer 56.

Alternatively, as shown in FIG. 5, the conductive cable 56 also can be extended through the hole 16 in the body of ice 12 without the use of a positioning mechanism such as anchoring mechanism 120 or float mechanism 58 by merely dropping the cable 56 into the body of water 10 so that the cable 56 drapes over an edge of the hole 16 in the body of ice 12. In this case, the conductive cable 56 is fixed relative to the hole 16 in the body of ice based upon the distance at which the base unit 56 of the display unit 52 is maintained away from the hole 16 in the body of ice 12.

A depth finder transducer system of the present invention has numerous advantages. First, the system permits quick and easy vertical alignment of a depth finding transducer within a body of water without requiring extensive manipulation of a positioning cable. The system permits quick and easy withdrawal of the transducer and cable of the system from the body of water through the hole in the body of ice by merely pulling the cable out of the water. Likewise, re-deployment of the transducer and cable within the water can be effected by simply dropping the cable and transducer into the water through the hole in the body of ice. The weight of the transducer (which tends to straighten the cable), the flexibility of the cable and the top mounting of the cable to the transducer cause automatic vertical alignment of the transducer within the body of water to produce an optimally oriented sonar sensing wave cone. In addition, the transducer of the system can include an additional sonar scanning head to permit detection of objects such as fish within a horizontal plane about the periphery of a cylindrical body of the transducer. This permits detection of fish outside the typical vertical sensing cone. The system of the present invention also can include a positioning means for selectively controlling the length of the cable that extends within the body of water to thereby selectively position the transducer at a desired depth within the body of water.

Although the present invention has been described with reference to preferred embodiments, workers skilled in the art will recognize that changes may be made in form and detail without departing from the spirit and scope of the invention.

What is claimed is:

1. An ice fishing depth finder system for use in detecting the presence of objects within a body of water located below a body of ice, the system comprising:

a display unit locatable on the body of ice adjacent a hole in the body of ice;

an electrically conductive flexible cable having a length extending between a first end and a second end, the first end capable of being electrically connected to the display unit;

a transducer electrically connected to the second end of the conductive cable and capable of transmitting a sonar wave sensing cone through a body of water to detect the presence of objects within the body of water; and positioning means cooperable with the conductive cable for allowing selective positioning of the positioning means along the length of the conductive cable, the positioning means being locatable adjacent the hole in the body of ice so that a portion of the cable length can extend from the positioning means through the hole in the body of ice to position the transducer within the body of water in substantial vertical alignment below and spaced from the positioning means.

2. The system of claim 1 wherein the positioning member comprises:

a float mechanism capable of floating on a surface of the body of water and being capable of being selectively positioned along the length of the conductive cable for preventing movement of the float mechanism relative to the conductive cable.

3. The system of claim 2 wherein the float mechanism comprises:

a buoyant float member having a bore extending therethrough so that the float member is capable of sliding coaxially over and longitudinally relative to the conductive cable; and a stopper cooperable with the float member to fix the float member relative to the conductive cable for preventing longitudinal sliding movement of the float member relative to the conductive cable.

4. The system of claim 1 wherein the positioning means comprises:

an anchoring means removably mountable relative to a hole in the body of ice and capable of selectively fixing the conductive cable relative to the anchoring means to prevent relative movement therebetween.

5. The system of claim 1 wherein the anchoring means comprises:

an frame member including a gripper disposed thereon, the frame being removably mountable relative to a hole in the body of ice and the gripper capable of selectively fixing the conductive cable relative to the gripper to prevent relative movement therebetween.

6. The system of claim 1 wherein the transducer comprises:

a cylindrical body including a sonar scanning head housed therein.

7. The system of claim 1 wherein the transducer comprises:

a cylindrical body;

a first sonar scanning head and a second sonar scanning head, the first scanning head being disposed within the cylindrical body adjacent an end surface of the cylindrical body and the second scanning head being disposed within the cylindrical body adjacent a side surface of the cylindrical body.

8. The system of claim 7 wherein the system further comprises:

means for determining the rotational position of the transducer.

9. The system of claim 8 wherein the determining means comprises a stripe extending along at least a portion of the length of the conductive cable.

10. The system of claim 1 wherein the second end of the conductive cable is connected to a center of an end surface of the cylindrical body of the transducer.

11. The system of claim 1 wherein the transducer has a weight sufficient to straighten the cable within the body of water.

12. The system of claim 11 wherein the conductive cable includes a material having the ability to return to a substantially straight shape from a coiled shape within a body of water having a temperature below 40° F.

13. A transducer system for use with a depth finder display unit, the transducer system comprising:

an electrically conductive flexible cable having a length extending between a first and second end;

a transducer electrically connected to the second end of the conductive cable;

positioning means cooperable with the conductive cable and capable of being selectively positioned along the length of the conductive cable to prevent relative movement therebetween, the positioning means being capable of maintaining spacing between the transducer and the positioning means so that the transducer can be located remotely from the positioning means.

14. A depth finder system for use in ice fishing to detect the presence of objects in a body of water below a body of ice, the system comprising:

a display unit positionable on the body of ice;

an electrically conductive flexible cable capable of being electrically connected to the display unit;

a transducer electrically connected to the conductive cable;

a float mechanism including a buoyant float member and a stopper, the float member having a bore extending therethrough so that the float member is capable of sliding coaxially over and longitudinally relative to the conductive cable, the stopper being cooperable with the float member to fix the position of the float member relative to the conductive cable and thereby prevent longitudinal sliding movement of the float member relative to the conductive cable;

wherein the float mechanism is capable of floating buoyantly on the body of water within the hole in the body of ice so that a portion of the conductive cable extends downwardly into the water from the float mechanism to position the transducer within the body of water at a location spaced from and in substantial vertical alignment below the float mechanism.

15. An ice fishing depth finder system for use in detecting the presence of objects within a body of water located below a body of ice, the system comprising:

a display unit locatable on the body of ice adjacent a hole in the body of ice;

an electrically conductive flexible cable having a first end and a second end, the first end capable of being electrically connected to the display unit;

a transducer capable of transmitting a sonar wave sensing cone through a body of water to detect the presence of objects within the body of water, the transducer including a top surface having a center wherein the second end of the conductive cable is electrically connected to the transducer at the center of the top surface of the transducer and the transducer has a weight sufficient to straighten the conductive cable within the body of water.

16. A method of detecting objects in a body of water located below a body of ice, the method comprising:

positioning a display unit on the body of ice adjacent a hole in the body of ice;

connecting electrically a first end of a flexible conductive cable to the display unit, the conductive cable including a transducer connected to its second end;

selectively fixing a position along a length of the cable relative to the hole in the body of ice and extending the second end of the cable through the hole in the body of ice into the body of water so that the transducer is located below the body of ice within the body of water in substantial vertical alignment below the fixed portion of the cable;

driving the transducer to transmit a sonar wave sensing cone within the body of water to detect the presence of objects within the sensing cone.

17. A method of detecting objects in a body of water located below a body of ice, the method comprising:

positioning a display unit on the body of ice adjacent a hole in the body of ice;

connecting electrically a first end of a flexible conductive cable to the display unit, the conductive cable including a transducer connected to its second end;

selectively fixing a position along a length of the cable relative to the hole in the body of ice and extending the second end of the cable through the hole in the body of ice into the body of water so that the transducer is located below the body of ice within the body of water in substantial vertical alignment below the fixed portion of the cable;

driving a first sensing head of the transducer to transmit a sonar wave sensing cone from a bottom surface of the transducer within the body of water to detect the presence of objects within the sensing cone; and driving a second sensing head of the transducer to transmit a sensing cone from a side surface of the transducer within the body of water to detect the presence of objects within the sensing cone.

18. The method of claim 17 and further comprising the step of:

selectively rotating the conductive cable to rotate the transducer within the body of water so that the sensing cone produced by the second scanning head sweeps a path through the body of water.

19. A method of detecting objects in a body of water located below a body of ice, the method comprising:

positioning a display unit on the body of ice adjacent a hole in the body of ice;

connecting electrically a first end of a flexible conductive cable to the display unit, the conductive cable including a transducer connected to its second end;

arranging a positioner adjacent the hole in the body of ice;

extending the second end of the cable through the hole in the body of ice and into the body of water so that the transducer is located within the water below the body of ice;

selectively fixing a position of the cable relative to positioner so that the transducer becomes located within the body of water in substantial vertical alignment below the positioner; and driving the transducer to transmit a sonar wave sensing cone within the body of water to detect the presence of objects within the sensing cone.

20. The transducer system of claim 13 wherein the positioning means has a length substantially less than the length of the conductive cable.

* * * * *